Oct. 25, 1927.
H. H. RUEDEBUSCH
1,646,766
VEHICLE SIGNAL
Filed March 5, 1927    2 Sheets-Sheet 2
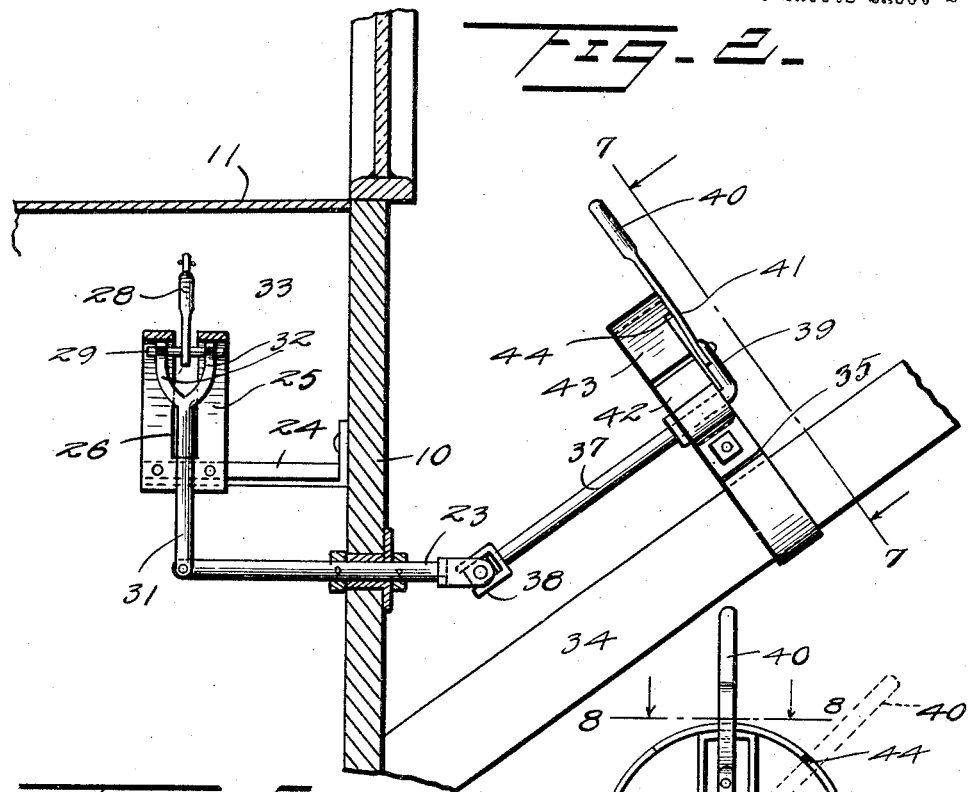
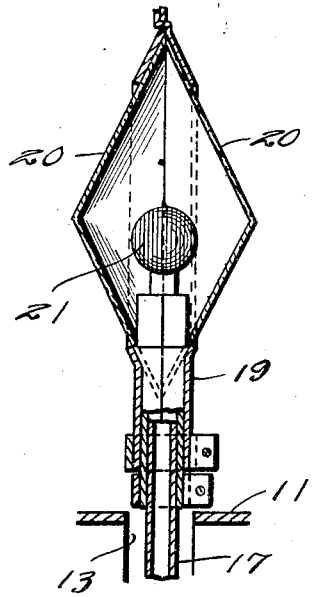
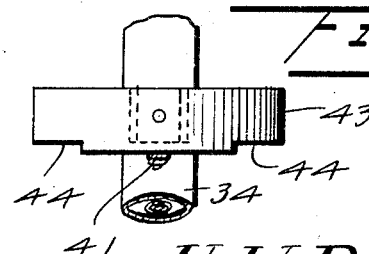
Inventor
H. H. Ruedebusch
By Watson E. Coleman
Attorney Patented Oct. 25, 1927.

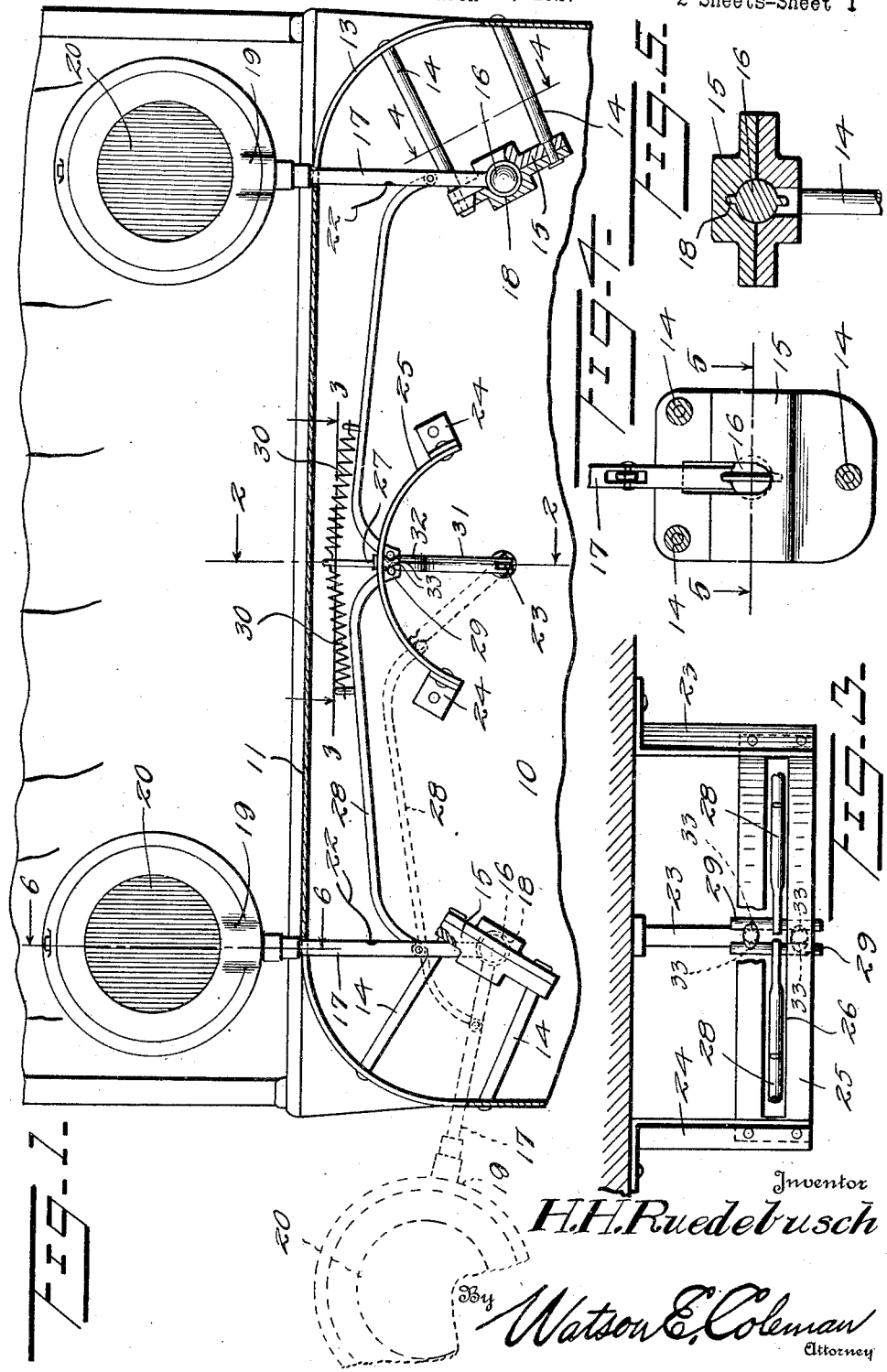

1,646,766

UNITED STATES PATENT OFFICE.

HERMAN H. RUEDEBUSCH, OF ELKTON, SOUTH DAKOTA.

VEHICLE SIGNAL.

Application filed March 5, 1927. Serial No. 173,134.

This invention relates to vehicle signals and more particularly to a signal for indicating the intention of the driver of an automobile to turn.

An important object of the invention is to produce a device of this character which will be neat in appearance and simple in its construction and which may be very readily applied to the vehicle.

A further object of the invention is to provide a signal having a movable arm or arms and novel and improved mechanism for shifting these arms from an inoperative or non-signaling position to their signaling positions.

A further object of the invention is to provide a device of this character including means whereby the signal is automatically restored to its inoperative position upon release of the operating mechanism.

These and other objects I attain by the construction shown in the accompanying drawings, wherein for the purpose of illustration is shown a preferred embodiment of my invention and wherein:

Figure 1 is a sectional view through the cowl of an automobile having signalling mechanism constructed in accordance with my invention applied thereto;

Figure 2 is a section on the line 2—2 of Figure 1;

Figure 3 is a section on the line 3—3 of Figure 1;

Figure 4 is a section on the line 4—4 of Figure 1;

Figure 5 is a section through the bearing;

Figure 6 is a section on the line 6—6 of Figure 1;

Figure 7 is a section on the line 7—7 of Figure 2;

Figure 8 is a plan view of the control plate element on the section line 8—8 of Figure 7.

Referring now more particularly to the drawings, the numeral 10 generally designates the dash-board of an automobile and 11 the cowl thereof. In the wall of this cowl at the angle between the top and sides thereof, I form slots 13 extending transversely of the vehicle and into both the top and side walls. Within the space under the cowl adjacent each slot, I secure, by means of supports 14, the bearings 15 having sockets receiving spherical heads 16 upon the inner ends of signal arms 17. This spherical head 16 and bearings 15 are provided with coating tongue and groove engagement at 18, preventing twisting of the signal arm. This signal arm projects through the slot and has attached thereto a head 19, the front and rear walls of which have lenses 20 and at the interior of which is mounted an electrical illuminating element 21. The signal arms 17 are hollow and form conduits, by means of which lead wires 22 for the illuminating elements may be extended thereto and whereby these lead wires may be conducted to the space beneath the cowl.

Rotatably directed through the dashboard 10 is a shaft 23. Secured to the forward face of the dash by brackets 24 and ward face of the dash by brackets 24 and overlying the shaft in concentric relation thereto is an arcuate plate 25, which is longitudinally slotted, as at 26, from end to end. Bridging the slot at the center of the plate is a support 27, which projects upwardly from the plate. Pivotally connected at their outer ends to the signal arms 17 are links 28, the inner ends of which extend through the slot 26 and are provided with transversely extending heads 29, preventing withdrawal thereof through the slot. Springs 30 connected between the support 27 and these links hold the heads of the links in engagement with the under surface of the arcuate bar and draw the links toward the center of the arcuate bar, so that the signal arms are normally maintained in vertical position.

Secured to the forward end of the shaft 23 is a vertically extending arm 31, the upper end which is forked and has its arms 32 aligned longitudinally of the vehicle. These arms are provided in their opposite side faces with notches 33 receiving the corresponding ends of the heads 29 of the links 28.

It will be obvious that if the shaft 23 is rotated, this arm, by its engagement with the head 29 of a link 28, will shift this link longitudinally against the action of the spring 30 and thus cause the associated signal arm 17 to move from its vertical or non-signaling position to a substantially horizontal signaling position. In Figure 1, in dotted lines, I have shown the operation of this arm to effect an operation of the left hand signal. The corresponding movement of the arm in the opposite direction would cause an operation of the right hand signal and in each case, the signals would be effected without changing the position of the other signal.

Mounted upon steering post 34 of the vehicle is a member 35 affording a bearing 36 in which is rotatably mounted a shaft 37, the lower end of which is connected by a universal joint 38 of the shaft 23. The upper end of this shaft has an angular extension 39 connected with a handle 40 by a resilient strip 41. Secured to the member 35 by a bracket 42 is a control plate 43, which is arcuately curved with the axis of the bearing 36 as a center. This plate adjacent its ends has notches 44 into which the resilient section 41 of the operating handle springs when aligned therewith. When the handle is aligned with and engaged in either of these notches, a corresponding signal element has been moved to its signalling position.

It will be obvious that a construction of this character is capable of a considerable range of change and modification without materially departing from the spirit of the invention and I accordingly do not limit myself to such specific structure except as hereinafter claimed.

I claim:—

1. In a vehicle signal, a pair of spaced semaphore arms pivoted to swing from parallel non-signalling positions to signalling positions at substantially right angles to the non-signalling positions, means limiting movement of the semaphore arms when they arrive at non-signalling position, a link connected at each arm and extending toward the other arm, an arcuate plate having a slot through which the adjacent ends of the links are directed, a rotatable shaft concentric with the plate, an arm carried by the shaft and having its free end extended between adjacent ends of the links and springs yieldably maintaining the links in positions where the arms thereof are in non-signalling position.

2. In a vehicle signal, a pair of spaced semaphore arms pivoted to swing from parallel non-signalling positions to signalling positions at substantially right angles to the non-signalling positions, means limiting movement of the semaphore arms when they arrive at non-signalling position, a link connected at each arm and extending toward the other arm, an arcuate plate having a slot through which the adjacent ends of the links are directed, a rotatable shaft concentric with the plate, an arm carried by the shaft and having its free end extended between adjacent ends of the links and springs yieldably maintaining the links in positions where the arms thereof are in non-signalling position, said links each having at its inner end a head located at the side of the plate adjacent which the free end of said arm operates, said springs maintaining said heads in engagement with the plate.

In testimony whereof I hereunto affix my signature.

HERMAN H. RUEDEBUSCH.